Sept. 30, 1930.   L. A. HEIL   1,777,085
HASP FASTENING
Filed Jan. 28, 1930   2 Sheets-Sheet 1

INVENTOR.
Louis A. Heil,
BY
ATTORNEY

Sept. 30, 1930.　　　L. A. HEIL　　　1,777,085

HASP FASTENING

Filed Jan. 28, 1930　　　2 Sheets-Sheet 2

Patented Sept. 30, 1930

1,777,085

UNITED STATES PATENT OFFICE

LOUIS A. HEIL, OF MOBILE, ALABAMA

HASP FASTENING

Application filed January 28, 1930. Serial No. 424,078.

My invention relates to hatch-cover seal pins designed more particularly for sealing in wholly or partially closed position hatch covers for refrigerator cars, although not restricted to that particular use but including other uses where the novel features function substantially as in the particular use for which more especially designed.

One object is to provide a seal pin formed with an elongated loop at one end where attached to a bracket so as to have a rotatable or swinging movement and also a slidable movement to facilitate movement of the pin into locking and also unlocking relation to a keeper for the pin, a portion of the pin being formed so as to stand at an upward inclination above the plane of the bracket to which the pin is attached and a portion made hook-shaped and its end adapted to pass through the keeper consisting of parallel spaced apart fingers or ears each formed with an opening for reception of the hook-shaped end of the pin, said keeper-fingers or ears extending upward at an inclination to the plane of the bracket so as to permit the free end of the hook to pass through registering openings formed in the ears or fingers. The upward inclination of the shank of the hook affords a better grip for the hand in swinging or manipulating the hook, and also better positions the hook and fingers for engagement therewith a staple, hasp, or link for locking the closure or hatch-way cover in closed or partially closed position.

The invention has for a further object to provide a simple, strong and efficient device of the character mentioned composed of a minimum number of parts to lessen the cost of production and which is also easy of application.

To the accomplishment of the foregoing and such other objects as may hereinafter appear the invention consists in the features hereinafter particularly disclosed and then sought to be clearly defined by the claims, reference being had to the accompanying drawings forming a part hereof, and in which Figure 1 is a plan view of the seal pin, the bracket to which it is slidably and pivotally attached, and the forwardly projecting spaced apart fingers or ears to receive the free end of the pin; the pin being illustrated in engagement with the fingers or ears, and a hasp or link;

Figure 1:
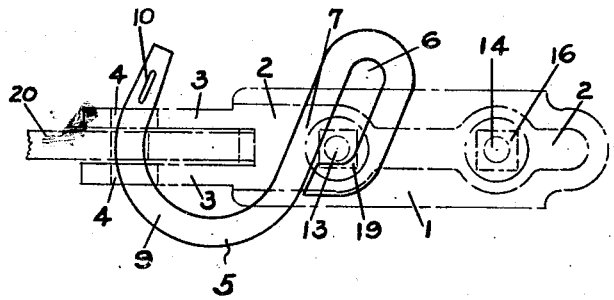

In the drawings the numeral 1 designates a metallic plate preferably formed on its top face with a longitudinally extending boss or raised portion 2 and formed at one end, or forward portion, with fingers or ears 3, spaced apart, and extending upwardly at an inclination preferably of about 30°, to the plane of the plate 1 and having their ends preferably enlarged, as shown, and each ear formed with an elongated slot or aperture 4, one in alinement with the other, the whole constituting a bracket to which is attached the pivotal and slidable seal pin 5. This pin is formed of a metallic rod of suitable cross sectional area and length, bent at one end to form an elongated loop 6 and having its shank 7 bent upwardly as at 8 to stand at an inclination or angle of preferably 20 degrees, more or less, to the plane of the loop end portion of the pin, or top face of the bracket, and the bent up portion then bent back upon itself to form a wide-open U shaped hook 8. The extremity of this hook is preferably tapered and formed with a through opening 10 for receiving some form of a seal strip or member (not shown) for holding the hook or sealing pin in locking position.

Figure 2:
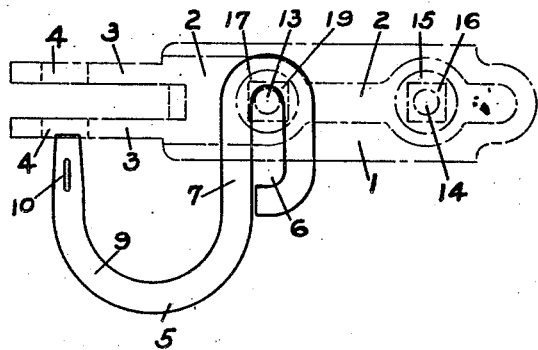
Figure 2 is a similar view with the seal pin swung to open or unlocking position.
Figure 3:
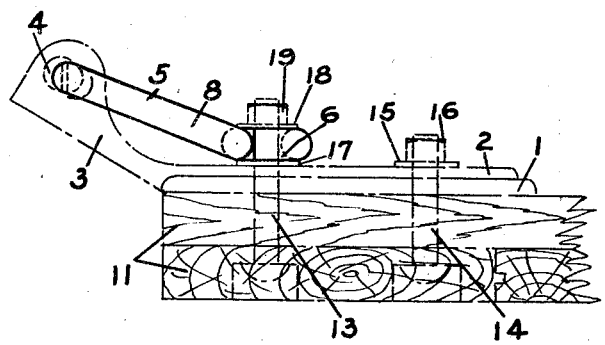
Figure 3 is a side elevation of Figure 2.
Figure 4:
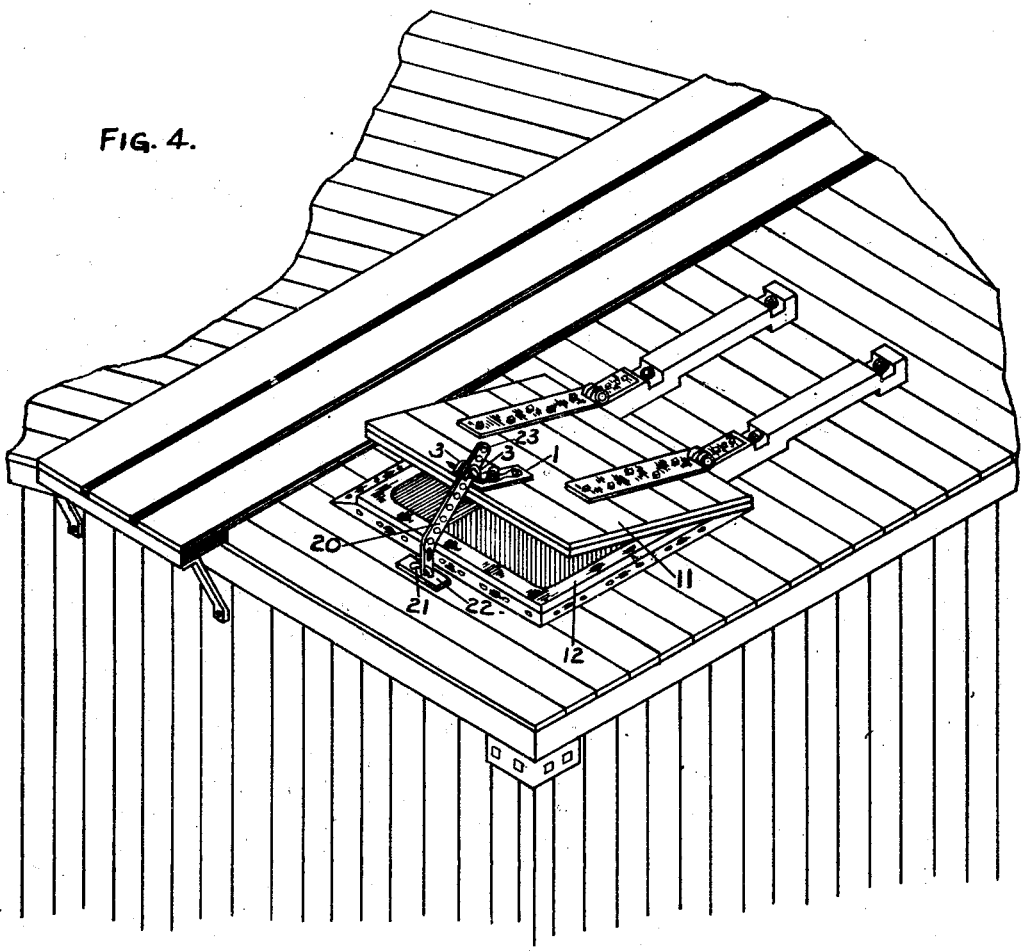
Figure 4 is a perspective of part of a freight car showing the seal pin applied to a door of a hatch-way in the top of the car.

The bracket 1 and seal pin 5 are secured to their support for instance, as illustrated a cover 11 of a hatchway frame 12, shown in Fig. 4 of the drawing, by a suitable bolt 13 passed through the timbers of the cover and also bracket 1 and through the loop of the seal pin, and by a suitable bolt 14 passed through the bracket and cover timbers as shown clearly in Fig. 3 of the drawing, the headed ends of the bolts being preferably counter-sunk in the timbers of the cover. The threaded end of bolt 14 is encircled by a washer 15 resting upon the face of the bracket and is provided with a nut 16, the end of the bolt being upset to secure the nut in place. A washer 17 encircles the bolt 13 and rests upon the face of the bracket, and the loop portion of the seal pin rests upon the washer 17 and another washer 18 rests upon the top of the loop portion of the pin, and a nut 19 fits on the threaded end of the bolt and the end of the bolt is upset to secure the nut in place. The bolt 13 passes through the elongated loop of the seal pin so that the pin has a slidable and rotative movement in shifting the pin to locking or holding position and also out of such position, the two positions being illustrated in Figs. 1 and 2 of the drawing. When the seal pin is in locking or holding position its free end passes through the registering openings in the spaced apart fingers or ears of the bracket and also through a staple, or hasp, or as shown through a link 20, to which the cover member carrying the seal-pin is to be connected and held locked. Figure 4 of the drawing shows the link 20 hinged at one end to a staple 21 secured by a plate 22, or otherwise, to the car roof adjacent to the metal hatch-way frame there illustrated, and the seal pin is swung so as to pass through a selected opening of a number of openings 23 formed in the link which then lies between the apertured ears, and a metal seal strip or ribbon, (not shown) or other means passed through the opening in the end of the pin, so as to lock the parts together with the hatch-way cover either closed, or as shown partially open, as may be desired. While Fig. 4 shows the seal pin used in connection with a freight car hatch-way and its cover it is obvious and to be understood that it may be elsewhere and otherwise used where the elements will function in substantially the same manner.

The operation of the structure of the invention and resulting advantages being clear from the foregoing description a restatement of the same is unnecessary. While the preferred details of the construction have been illustrated and described with particularity it is to be understood that changes may be made therein without departure from the essential features shown and described.

Having described my invention and set forth its merits what I claim is:—

1. In a hasp-fastening, a seal pin comprising a bracket having forwardly extending parallel spaced apart apertured ears, and a member slidably and rotatably mounted on the bracket, said member having an elongated loop for the passage of a bolt for attachment of the member to the bracket and permit slidable and rotative movement of the member, a portion of the member being shaped to form an open U-shaped hook and a portion inclined upwardly at an angle to the plane of its loop portion, the free end of the hook adapted to pass through the apertured ears of the bracket and through a member disposed between the ears.

2. In a hasp-fastening, a seal pin comprising a bracket having extending parallel spaced apart apertured ears standing at an upward inclination to the plane of the bracket, a slidable and rotatably mounted member formed with an elongated loop to receive a bolt for attachment of the member to the bracket and permit slidable and rotative movement of the member, a portion of the member being shaped to form an open U-shaped hook and a portion inclined upwardly at an angle to the plane of its loop portion to position the free end of the hook to pass through the apertured ears of the bracket and through a member disposed between the ears, and a bolt passed through the bracket and elongated loop of the slidable and rotative member and provided with means for holding the looped portion of the slidable and rotative member and the bolt in operative relation to each other.

In testimony whereof I affix my signature.

LOUIS A. HEIL.